(No Model.)

J. WHITELEY.
TREAD, STEP, OR MAT.

No. 344,704. Patented June 29, 1886.

Witnesses:
James P. DuHamel
Walter S. Dodge

Inventor:
Joseph Whiteley
W. F. Thompson & Co.,
Attys,
by Dodger Son
Associate Attys.

N. PETERS, Photo-Lithographer, Washington, D. C.

UNITED STATES PATENT OFFICE.

JOSEPH WHITELEY, OF SALFORD, COUNTY OF LANCASTER, ENGLAND.

TREAD, STEP, OR MAT.

SPECIFICATION forming part of Letters Patent No. 344,704, dated June 29, 1886.

Application filed April 13, 1886. Serial No. 198,750. (No model.) Patented in England, June 19, 1884, No. 9,207; and October 11, 1884, No. 13,457.

*To all whom it may concern:*

Be it known that I, JOSEPH WHITELEY, a subject of the Queen of Great Britain, residing at Salford, in the county of Lancaster, England, have invented certain new and useful Improvements in Treads, Steps, or Mats, and Mattings, (for which I have received Letters Patent in Great Britain, dated June 19, 1884, No. 9,207, and dated October 11, 1884, No. 13,457,) of which the following is a specification.

The present invention is a division of another application, filed by me February 9, 1886, Serial No. 191,342.

I desire to state here that I am aware that mats and floor-coverings have been made of alternate strips of wood or metal and rubber, with the rubber projecting beyond the wood. The faults of these are twofold: First, the rubber is easily pulled out; second, to partly avoid this the strips have to be so deep that a very large amount of rubber is wasted, and to overcome these is the object of my invention.

Figure 1:
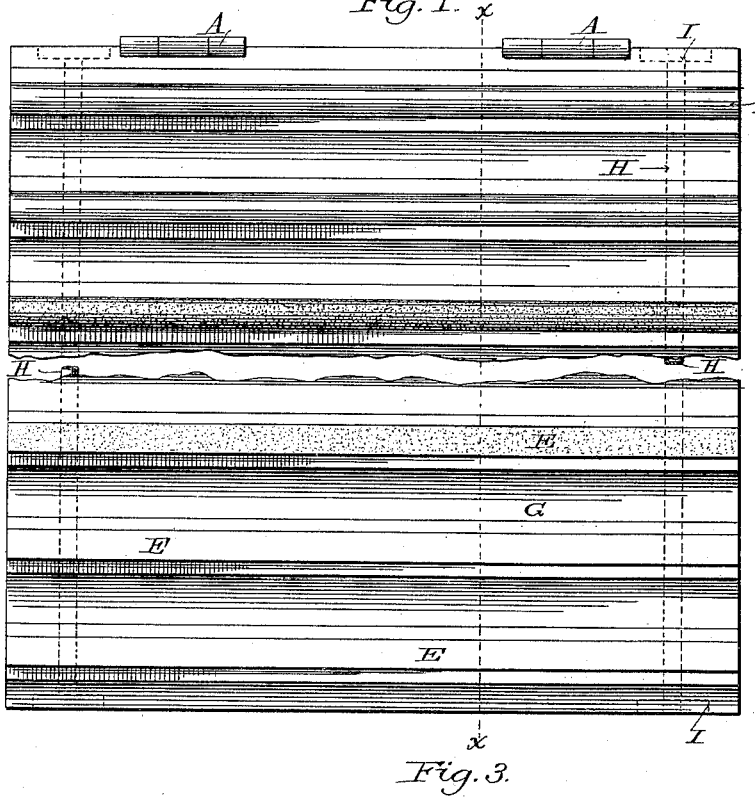
Figure 2:
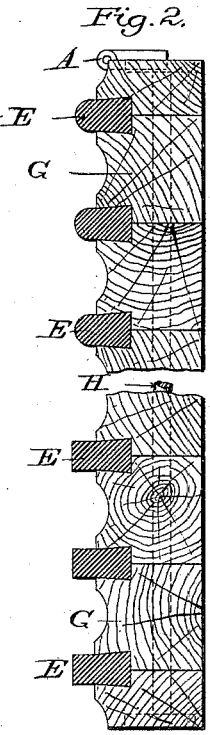
Figure 3:
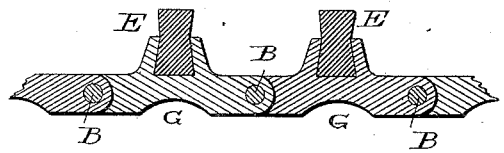
Figure 4:
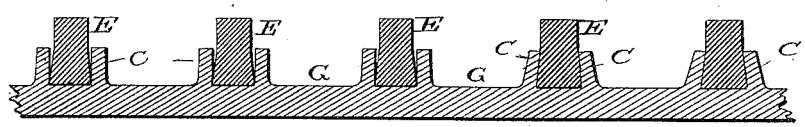

In the drawings, Figure 1 is a face view of a mat constructed in accordance with my invention; Fig. 2, a section of the same on the line $x\ x$; Fig. 3, a cross-section of a mat arranged so as to roll up; Fig. 4, a similar view showing the manner of inserting the rubbers when the metallic frame is used.

The rubbers E are formed in long strips, drawn out in the soft state through a die applied to the mouth of the masticating-machine. By varying the shape of the die of course the form of the rubber strips will be varied. The strips, after being thus formed, are vulcanized and inserted in the blocks G.

As shown in Figs. 1 and 2, the blocks G are formed of wood, and are grooved along their adjacent edges, so that when in position they form a recess or socket of the same shape in cross-section as the rubber strips E. After placing the strips E in place the bolts H are passed transversely through the wooden blocks, as shown in Figs. 1 and 2, nuts I being applied to the bolts to draw the parts firmly together, thus binding the rubber strips firmly in the sockets in the wooden strips. The projecting surfaces of the strips E prevent any wear or injury to the surface of the supporting-strips of wood G, and it is obvious that at any time the worn or damaged strips E can be easily and cheaply renewed. The under side of the matting or floor-covering can be polished, so that by turning it over an elastic and polished floor is obtained for dancing or similar purposes.

In cases where it is desirous to have a flooring that will roll up the mats are made very long and narrow, and are hinged together, as shown in Fig. 3; and it is obvious that in place of wood, plates of metal can be used, as shown in said figure, the sections being pivoted together by bolts B. When the metal plates are used, they are rolled with their flanges C vertical, as shown on the left of Fig. 4, and then bent over the dovetails, as shown on the right in Fig. 4; and the various metal pieces may be tied together by bolts, or hinged together, as in the case of the wooden framework.

In the foregoing description the metallic plates may be made as gratings, allowing the dirt to fall through intervening spaces between the rows.

The sections of flooring may be made of any shape or size desired, and may be provided with hinges A, as shown in Figs. 1 and 2, to facilitate handling.

It is obvious that the bolts H may be dispensed with, and any other form of device for securing the blocks G together may be substituted.

I am aware that it is not new to construct a floor-matting of wood, with strips of metal, or similar material inserted therein flush with the face of the mat, and to this I lay no claim. Under my construction the rubber strips project up above the surface of the matting and protect the latter from wear. Besides this, they are lighter and noiseless. It is immaterial whether the blocks G be made up of several pieces, as in Figs. 1, 2, and 3, or made of a single piece of wood or metal, as shown in Fig. 4; and it is likewise apparent that the sections hinged together may contain a number of the strips E, as in Figs. 1 and 2, or only a single strip each, as in Fig. 3.

Having thus described my invention, what I claim is—

1. A mat or floor-covering composed of a series of blocks, G, grooved on their contiguous faces to form sockets, and strips E, of rubber, inserted in said sockets and projecting up above the surface of the blocks G.

2. In combination with blocks G, grooved on their adjacent faces, strips E, inserted in said sockets, and bolts H, passing through the strips G and binding them together.

3. A mat or floor-covering composed of a series of plates hinged or pivoted together, and provided on one face with rubber projections.

In testimony whereof I have signed my name to this specification in the presence of two subscribing witnesses.

JOSEPH WHITELEY.

Witnesses:
W. P. THOMPSON,
JOHN HAYES.